J. P. RODENBUR.
CAR STEP.
APPLICATION FILED OCT. 26, 1916.
1,209,034.
Patented Dec. 19, 1916.
2 SHEETS—SHEET 1.
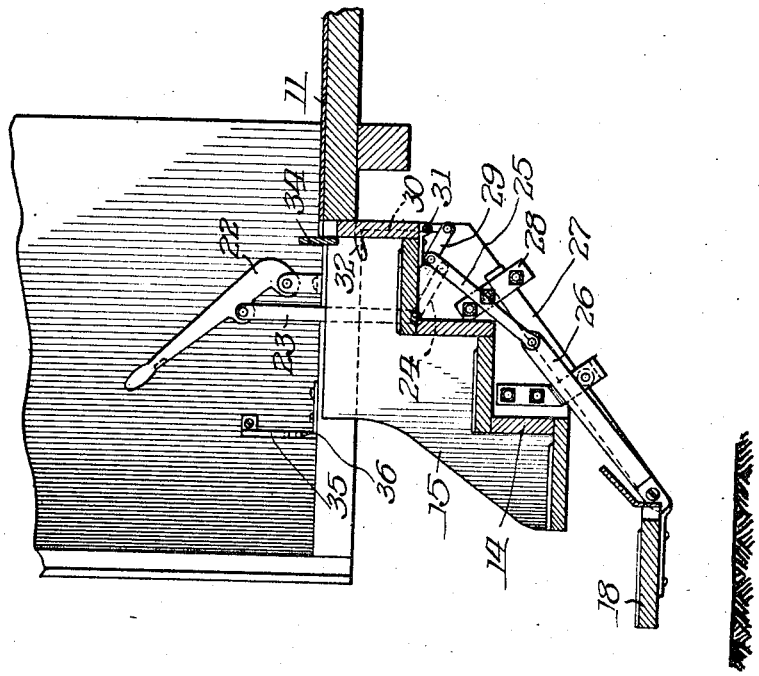
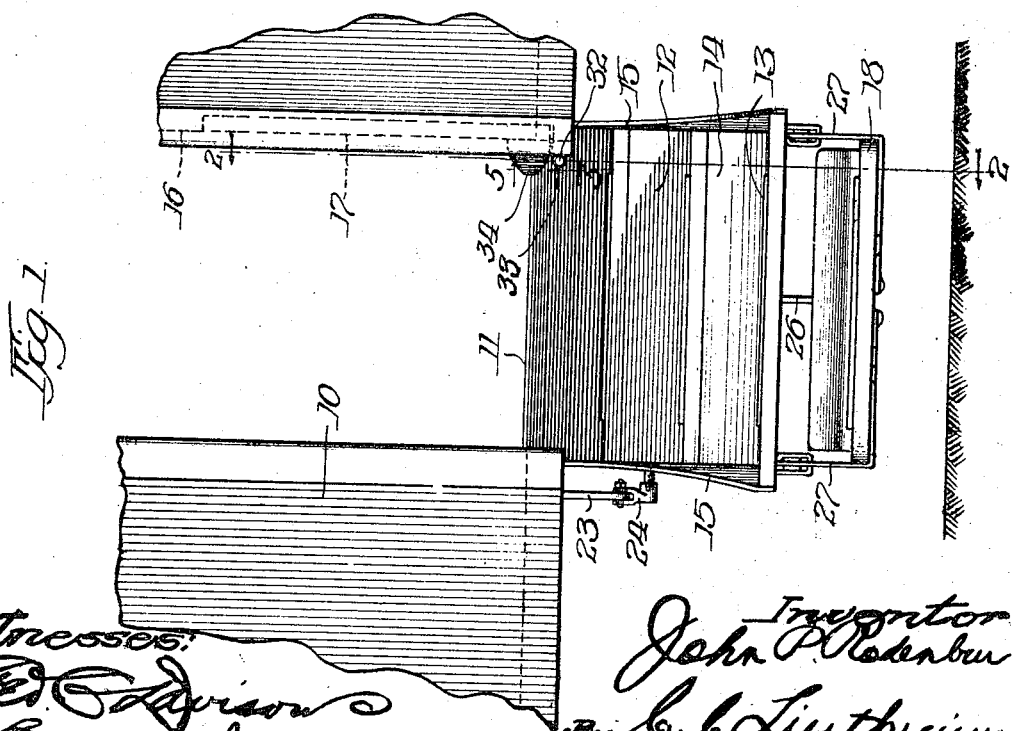

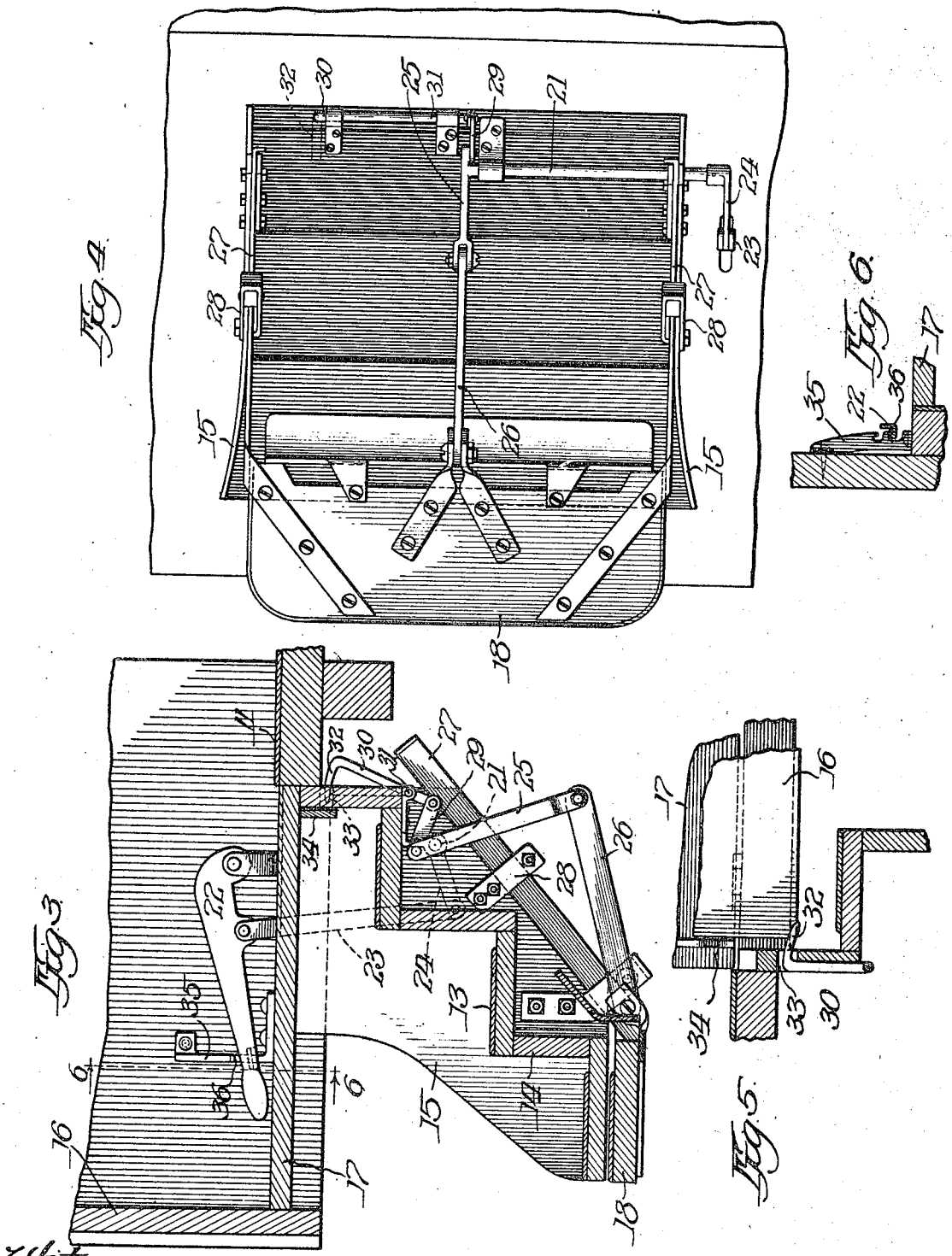

UNITED STATES PATENT OFFICE.

JOHN P. RODENBUR, OF DULUTH, MINNESOTA.

CAR-STEP.

1,209,034.

Specification of Letters Patent.

Patented Dec. 19, 1916.

Application filed October 26, 1916. Serial No. 127,841.

*To all whom it may concern:*

Be it known that I, JOHN P. RODENBUR, a citizen of the United States, and resident of Duluth, in the county of St. Louis and State of Minnesota, have invented certain new and useful Improvements in Car-Steps, of which the following is a specification.

My invention relates to an extension step for cars, which is particularly applicable to railroad passenger cars or coaches.

One of the objects of my invention is to provide a supplemental step for attachment to a portion of the fixed steps of a passenger coach in such manner that the step of my invention may be caused to extend below the lowermost step of the fixed steps when in operative position and to be withdrawn thereunder when in inoperative position.

Another object is to provide operating means whereby said step may be actuated.

A further object is the provision of means whereby the step cannot be lowered until the vestibule doors are opened and the doors cannot be closed until the step is raised.

Further objects will be apparent to those skilled in the art from an observation of the drawings accompanying this description.

My invention comprises a combination of an adjustable car step and vestibule door and is designed to obviate certain elements of danger which exist in present constructions.

I am aware of the fact that car steps of the extension type have heretofore been employed, Patent No. 1170338, dated February 1st, 1916, for an extension car step having been issued to me.

The object of the present improvement is to provide means so that the step disclosed in my patent may be so operated with respect to the opening and closing of the vestibule door as to reduce to a minimum the chances of injury to passengers who may be standing on the station platform as the train carrying coaches provided with my step arrives and leaves.

When a passenger train composed of vestibule cars enters a station the conductor, brakeman or porter customarily opens the trap door on the floor of the vestibule and fastens it back. He then opens the vestibule door on the side of the car and fastens it back. These operations are usually performed while the train is in motion before it comes to a standstill in the station. On a car equipped with an adjustable step the brakeman, conductor or porter would then lower the step so as to have it ready when the train came to a standstill; also as the train pulls out from the station, the vestibule door and then the trap door is closed. If the conductor, brakeman or porter is not careful to raise the extension step before the train leaves the station there is danger of the step, which of course projects beyond the side of the car, injuring some person standing alongside the train on the station platform. I propose by my invention to so arrange the mechanism operating the extension step that the side vestibule door cannot be closed until the step has been drawn up into place and the step cannot be lowered until the vestibule door is opened.

Attention is directed to the drawings, wherein—

Figure 1 shows an elevation of a car step, a vestibule door opening and an extension step made in accordance with my invention in lowered position; Fig. 2 is a sectional view on the line 2—2 of Fig. 1; Fig. 3 is a sectional view showing the extension step in raised position and the positions assumed by the several parts of the mechanism; Fig. 4 is a bottom view of a car step showing my extension step in lowered position; Fig. 5 is a sectional view on the line 5—5 of Fig. 1; Fig. 6 is a sectional view on the line 6—6 of Fig. 3.

10 designates a railway car or coach having at each end a platform 11, each side of the platform being cut away in the usual manner to provide for lateral steps 12, which steps include treads 13 and risers 14. The steps are provided with the usual side shields 15, if desirable.

Referring to Fig. 3, numeral 16 designates a side vestibule door and numeral 17 a trap door. In this instance the trap door 17 is arranged to be closed after and opened before the vestibule door 16.

18 is the extension step embodying my invention, this step and the operating means being fully described in my Patent No. 1170338 above noted. While in the patent referred to and the drawings accompanying this description the operating means of the step are shown as being attached to the side shield 15 of the fixed car steps, it will be understood that if such shields are not employed suitable attachments to the under side of the steps themselves may be used, securing coöperation between the lowering and raising of the step 18 and the trap and vestibule doors 17 and 16. I show in the preferred embodiment a shaft 31, best seen in Fig. 4, connected by link 29 to shaft 21, which is the shaft operated by the attendant who raises and lowers the step and opens and closes the several doors of the vestibule. In Fig. 3, numeral 22 designates such a handle connected by pivoted links 23 and 24 to shaft 21. Also attached to shaft 21 is an arm 25, pivoted with a link 26 for moving the step 18. A guide bar 27, suitably mounted in stirrups 28, controls the sliding movement and controls the position of the step 18. In the preferred embodiment of my invention the shaft 31 is shown as extending to the opposite side of the steps 12 from that on which the handle 22 is positioned. A dog 30, pivoted intermediate its end portions on shaft 31, is connected through arm 29 to the shaft 21 and adapted to rock when the handle 22 is operated, thereby raising or lowering the step 18. The dog 30 is provided with a hook end 32, adapted to extend through an aperture 33 in one of the risers 14 of the steps 12. The position of this dog 30 is such that when the step 18 is in lowered position and the projection 32 extends through the aperture 33 that the projection 32 lies against the door 16, as best seen in Fig. 5, and tends to hold the door in open position, or, in other words, the door 16 cannot be closed until the dog 30 is withdrawn.

To prevent the step 18 being lowered until the trap door 17 is raised I employ a locking block 34, secured to the underside of the trap door 17 and adapted to overlie the aperture 33 in the riser 14 of the top step. Such an arrangement will prevent the hook end 32 of the dog 30 from projecting through the aperture 33 until the block is removed, which removal is occasioned when the door 17 is raised and not before. So it will be observed that by thus closing the aperture through which the hook end 32 of the dog 30 operates, operation of the train of mechanisms which lowers and raises the step 18 is prevented, even though the handle 22 is disengaged from its holding means.

While I have shown a particular form of stop to prevent the operation of the dog 30, and hence the train of mechanism operating the step, I do not confine my means to that shown, but consider any means which performs the same function, that is,—of preventing the lowering of the step 18 until the vestibule door 16 is opened or trap door 17 is opened, as coming within the spirit of my invention.

Fig. 6 illustrates a means of retaining the handle 22 in position when the step 18 is raised, thus serving as a means for holding the step 18 in raised position. The means consists of a notched bracket 35, with which a lip 36 and the rear side of the handle 22 engages, so that when the handle is in the position shown in Fig. 2, which is the position the handle assumes when the step 18 is in raised position, the lip 36 will engage one of the notches in the bracket 35, thereby pulling the step into raised position.

The operation of the device is as follows: A car in motion will have the extension step 18 raised against the underside of the lowermost step of the fixed steps of the car. The vestibule door 16 and the trap door 17 are closed. As the train approaches a station the conductor, brakeman or porter will raise the trap door 17, disengage the handle 22 from the bracket 35 and raise it, thus lowering the step 18. The vestibule door 16 may then be opened. As the train leaves the station the attendant will endeavor to close the trap and vestibule doors, but, as in the preferred embodiment shown, the vestibule door 16 has to be closed before the trap door 17. It will be impossible to so close this door, because of the engagement therewith by the hook end 32 of the dog 30. This is best seen in Fig. 5. So then the attendant will operate the handle 22 from the position shown in Fig. 2 to that shown in Fig. 3, thereby raising the step, which operation will withdraw the dog 36 from contact with the door 16. The door may then be closed, and also the trap door 17, the closing of the trap door 17 bringing the stop 34 over the aperture 33.

It will be observed that I have provided means for controlling the operation of an extension step so as to prevent its injuring any person who may be standing alongside the track or station platform. Furthermore, provisions are made so that it will be impossible for the attendant operating the vestibule and trap doors to fail to raise or lower the step, as the case may be.

I do not limit myself to the exact form described and shown, but consider such improvements as are apparent as coming within the scope of my invention.

Having fully described my invention, what I desire to cover by Letters Patent is:

1. In a car, the combination of a vestibule having trap and vestibule doors and fixed steps, of a movable step adapted to underlie the bottom step of the fixed steps when in raised position and to extend below and outwardly thereof when in lowered position, automatic means for operating said step, means operable to prevent the closing of said vestibule door while said movable step is in lowered position, substantially as described.

2. In a car, the combination of a vestibule having trap and vestibule doors and fixed steps, of a movable step adapted to underlie the bottom step of the fixed steps when in raised position and to extend below and outwardly thereof when in lowered position, means for operating said step, and means preventing the lowering of said movable step while said trap door is in closed position, substantially as described.

3. In a car, the combination of a vestibule having trap and vestibule doors and fixed steps, of a movable step adapted to underlie the bottom step of the fixed steps when in raised position and to extend below and outwardly thereof when in lowered position, means for operating said step, automatic means operable to prevent the closing of said vestibule door while said movable step is in lowered position, and means for preventing the lowering of said movable step while said trap door is in closed position, substantially as described.

4. In a car, the combination of a vestibule having trap and vestibule doors and fixed steps, of extension steps mounted underneath said fixed steps for movement relative thereto, means for operating said extension steps, said means including a dog, which dog is arranged for coöperative action with said trap door, and a stop on said trap door adapted for coöperation with said dog, substantially as described.

5. In a car, the combination of a vestibule having trap and vestibule doors and fixed steps, of a movable step adapted to underlie the bottom step of the fixed steps when in raised position and to extend below and outwardly thereof when in lowered position, means for operating said movable step, a dog attached to said operating means and adapted to be projected into engaging position with a vestibule door when said door is opened and to be withdrawn before the door is closed as operating means are operated, substantially as described.

6. In a car, the combination of a vestibule having trap and vestibule doors and fixed steps, of a movable step adapted to underlie the bottom step of the fixed steps when in raised position and extend below and outwardly thereof when in lowered position, means for operating said step, a dog attached to said operating means and adapted to be projected into engaging position with the vestibule door when the same is opened and the step is lowered and to be withdrawn therefrom when the step is raised, the trap door being provided with means whereby the operation of said dog is prevented when the trap door is in closed position, substantially as described.

7. The combination with an extension step for railway cars of operating means whereby said step is lowered and raised, a dog connected to said means and operative therewith, a stop adapted for coöperation with said dog whereby the movement thereof is prevented when the stop is in contact with said dog and the operation of said operating means is permitted when said stop is out of engagement with said dog, substantially as described.

Signed at Duluth, in the county of St. Louis, and State of Minnesota, this 21st day of October, 1916.

JOHN P. RODENBUR.

Witnesses:
 A. M. Gow,
 J. E. Carlson.